United States Patent
Lai et al.

(10) Patent No.: US 9,059,582 B2
(45) Date of Patent: Jun. 16, 2015

(54) FALSE-TRIGGERED IMMUNITY AND RELIABILITY-FREE ESD PROTECTION DEVICE

(71) Applicant: GLOBALFOUNDRIES Singapore Pte. Ltd., Singapore (SG)

(72) Inventors: Da-Wei Lai, Singapore (SG); Mahadeva Iyer Natarajan, Clifton Park, NY (US)

(73) Assignee: GLOBALFOUNDRIES Singapore Pte. Ltd., Singapore (SG)

( * ) Notice: Subject to any disclaimer, the term of this patent is extended or adjusted under 35 U.S.C. 154(b) by 217 days.

(21) Appl. No.: 13/782,395

(22) Filed: Mar. 1, 2013

(65) Prior Publication Data

US 2014/0247526 A1 Sep. 4, 2014

(51) Int. Cl.
H02H 9/04 (2006.01)

(52) U.S. Cl.
CPC ..................... *H02H 9/046* (2013.01)

(58) Field of Classification Search
CPC ...... H02H 9/04; H02H 9/046; H01L 27/0251; H01L 27/0262; H01L 27/0266
USPC .......................................................... 361/56
See application file for complete search history.

(56) References Cited

U.S. PATENT DOCUMENTS

| | | | |
|---|---|---|---|
| 5,901,022 A * | 5/1999 | Ker ................................... | 361/56 |
| 2004/0109270 A1* | 6/2004 | Stockinger et al. ............. | 361/56 |
| 2006/0125015 A1* | 6/2006 | Woo .............................. | 257/355 |
| 2008/0112204 A1* | 5/2008 | Mallikararjunaswamy .... | 365/94 |
| 2010/0328827 A1* | 12/2010 | Lai et al. ......................... | 361/56 |

\* cited by examiner

*Primary Examiner* — Thienvu Tran
*Assistant Examiner* — Kevin J Comber
(74) *Attorney, Agent, or Firm* — Ditthavong & Steiner, P.C.

(57) ABSTRACT

An acceptable voltage margin between a voltage level for triggering electrostatic current discharge and a voltage level for programming operation of an OTP device is determined. Activation of an ESD protection circuit is controlled in part in response to a false trigger prevention circuit. To avoid gate oxide breakdown that may occur with a MOSFET protection device used for higher voltage requirements of an OTP device, the ESD protection circuit employs a bipolar transistor.

20 Claims, 4 Drawing Sheets

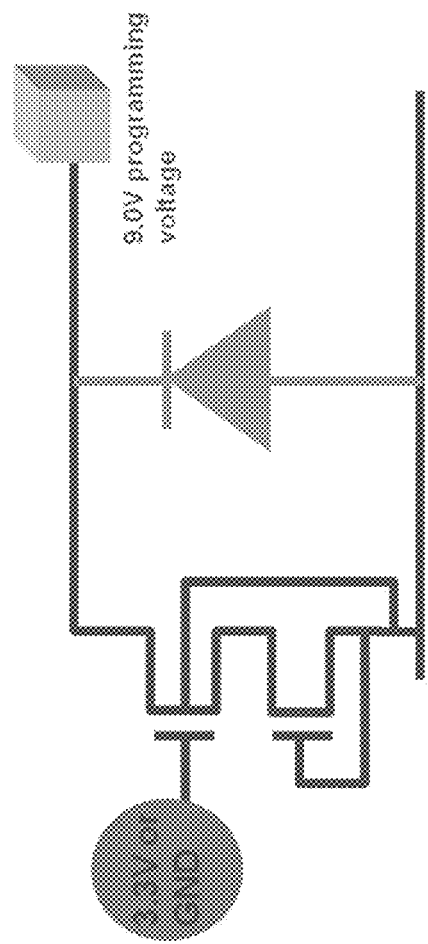

FALSE-TRIGGERED IMMUNITY AND RELIABILITY-FREE ESD PROTECTION DEVICE

TECHNICAL FIELD

This present disclosure relates to electrostatic discharge (ESD) protection, more particularly in relation to one-time programmable (OTP) integrated circuit devices. The present disclosure is particularly applicable to 0.18 micrometer (μm) multi-project wafers (MPW).

BACKGROUND

Recent development of some OTP products, such as flash drives, LCD-drivers and the like, has incurred an increase in programming voltage from the 3.3 volt level to 8.5 volts. The purpose of the ESD protection device is to protect victims and bypass ESD current during an electrostatic discharge event. The typical ESD protection device, such as an NMOSFET circuit provided for 3.3 volt applications, presents reliability issues if applied to the higher voltage devices. Gate-drain oxide breakdown in FET circuitry is a likely possibility.

Moreover, the protection circuit should not turn on under normal and programming operation modes. Normally, the junction breakdown of 3.3V devices is around 9.7V. For an 8.5V programming voltage OTP application, the Vt1 "trigger voltage" of an ESD device can't be lower than the programming voltage; otherwise the ESD device will cause a false trigger, thus interfering with normal and programming operation modes.

A critical need thus exists for an ESD protection device for one-time programmable products that is highly reliable and immune to false-triggering under a high damping noise environment or under a latch-up testing environment. Such a protection device should operate at a voltage margin that can accommodate, for example, programming timing of about 50 μs pulse width with 10 μs rise time. The trigger voltage should be set at a level that adequately protects the circuit during electrostatic discharge to divert discharge current between supply terminals, but at a level that prevents diversion of current during the relatively high voltage programming operation for one-time programmable (OTP) devices.

SUMMARY

The needs described above are fulfilled, at least in part, by determining an acceptable voltage margin between a voltage level for triggering diversion of electrostatic current discharge from supply terminals and a voltage level for programming operation of an OTP device. Activation of an ESD protection circuit is controlled in part in response to a false trigger prevention circuit. To avoid gate oxide breakdown that may occur with a MOSFET protection device used for higher voltage requirements of an OTP device, the ESD protection circuit employs a bipolar transistor.

The bipolar transistor of the ESD protection circuit is coupled between supply terminals. A control circuit for the transistor is coupled to an output of the false trigger prevention circuit. The false trigger prevention circuit is connected in series with a downsize capacitive circuit across the supply terminals. The control circuit comprises an FET transistor connected in series with a resistor across the bipolar transistor, a junction between the control FET transistor and the resistor connected to the base of the bipolar transistor. An output node of the false trigger prevention circuit is connected to the gate of the control FET transistor. A resistor in the control circuit is set to a resistive value to configure the resistive-capacitive time constant of the circuit commensurate with the determined voltage margin.

The false trigger prevention circuit includes a first FET, connected between a first supply terminal and the false trigger prevention circuit output node, and a second FET, connected between the gate of the first FET and a second supply terminal. The gate of the second FET is connected to the false trigger prevention circuit output node.

The downsize capacitive circuit includes a capacitor and current mirror connected in series between the false trigger prevention circuit output node and the second supply terminal. The current mirror comprises first and second capacitive circuit FETs connected in parallel, the gates of the capacitive circuit FETs connected to each other.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which:

FIG. 1 is a schematic diagram of a traditional stack NMOS power clamp of the prior art;

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves the current problems of gate oxide unreliability, large trigger voltage margin, and large chip area requirements attendant upon forming OTP ESD protection for high voltage devices. In accordance with embodiments of the present disclosure, a poly gate stack is eliminated and a lateral NPN is utilized to avoid gate oxide unreliability issues. Further ESD requirements are met, and device size is reduced.

Still other aspects, features, and technical effects will be readily apparent to those skilled in this art from the following detailed description, wherein preferred embodiments are shown and described, simply by way of illustration of the best mode contemplated. The disclosure is capable of other and different embodiments, and its several details are capable of modifications in various obvious respects. Accordingly, the drawings and description are to be regarded as illustrative in nature, and not as restrictive.

FIG. 1 illustrates a traditional stack MOS OTP ESD protection device of the prior art, applied to protect an OTP device having a high 9.0 programming voltage. Reliability of this device is in jeopardy because of the likelihood of gate oxide breakdown with respect to the programming pad and the first gate. Moreover, the ESD device trigger voltage (Vt1) is likely to be too high to protect internal devices. Although a stack PMOS ESD protection device may be substituted, both alternatives require a large integrated circuit size to attain ESD performance.

Normally, the junction breakdown of 3.3V devices is around 9.7V. For 8.5V programming voltage OTP application, the Vt1 "trigger voltage" of the ESD device can't be lower than the 8.5V programming voltage, otherwise the ESD device will be false trigger and interfere with normal and programming operation modes. Thus the Vt1 trigger voltage of the ESD device should be designed to be between 8.6V to 9.6.

Figure 2B:
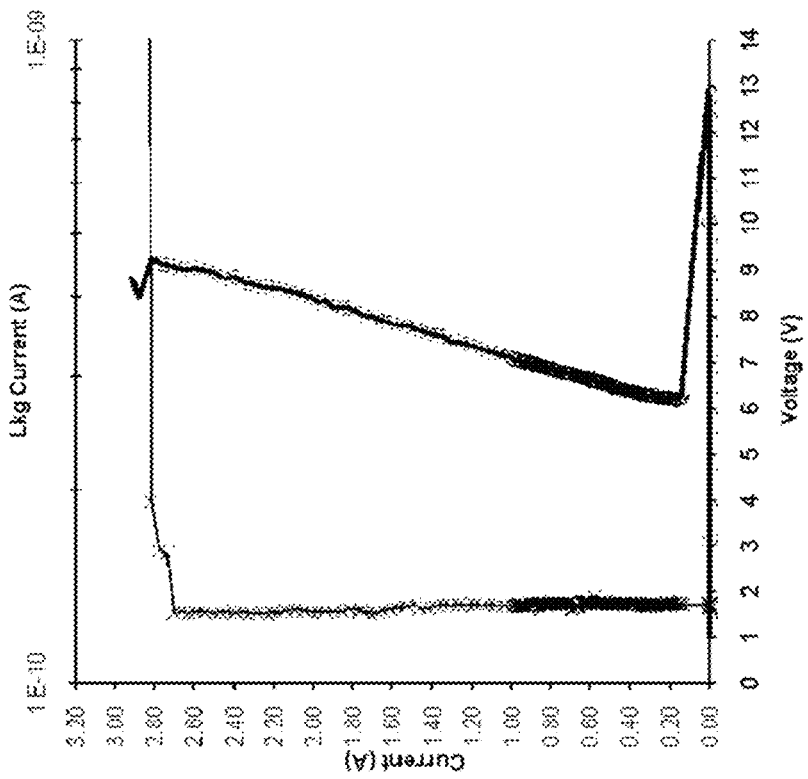
FIGS. 2a and 2b are a schematic diagram and a TLP characteristic representation of a traditional lateral NPN, respectively.
Figure 2A:
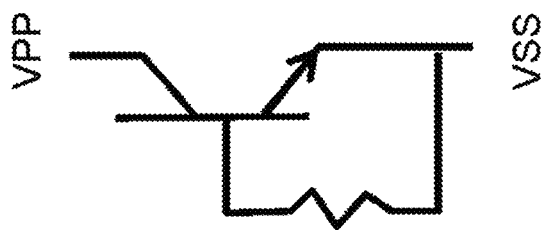

To address the reliability concern with respect to the high programming voltage, a lateral NPN transistor can be used in place of the MOS implementation. Elimination of a poly gate avoids the possibility of gate oxide breakdown. A single stage lateral NPN also occupies a significantly smaller size. The schematic diagram and TLP characteristic representation of traditional lateral NPN is shown in FIG. 2a and FIG. 2b, respectively. As indicated in the TLP characteristic, ESD performance (It2) is around 2.7 A, which is good enough to pass 2 KV HBM specification. The Vh holding voltage is around 6.0V, which is greater than the 3.6V maximum operation voltage so there is no latch-up risk. However, the Vt1 trigger voltage is around 13V, which may not meet requirements and is still too high to adequately protect internal circuits.

Figure 3:
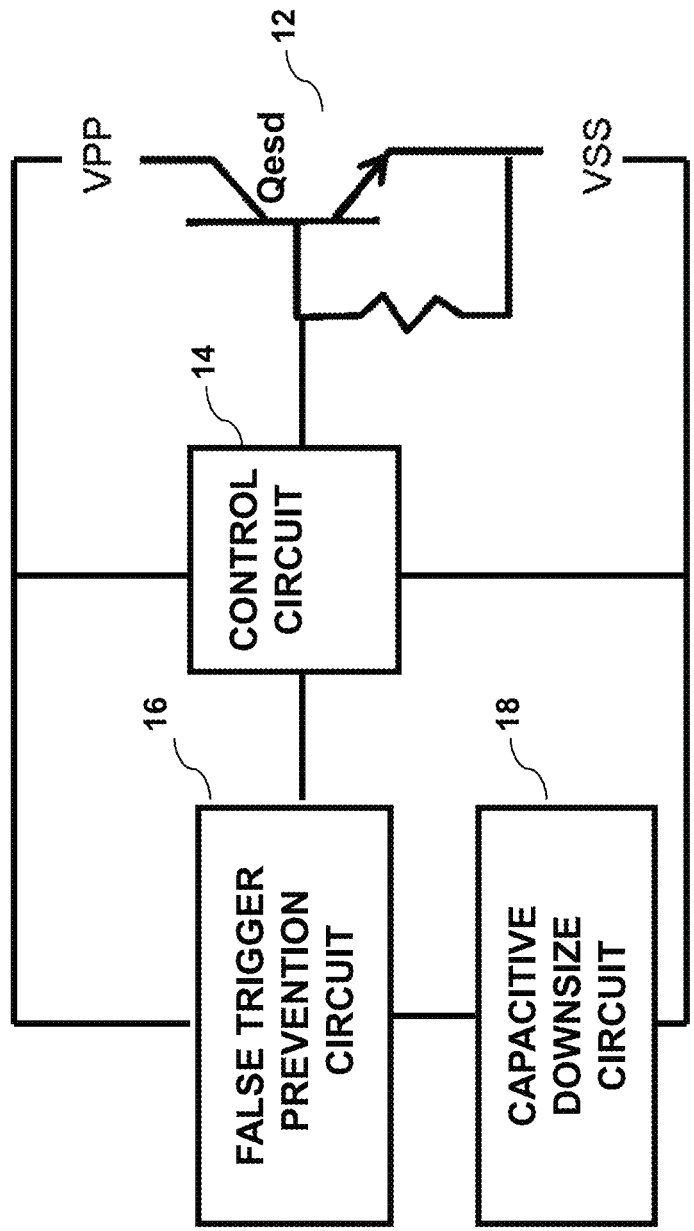
FIG. 3 is a block diagram of an ESD protection device in accordance with the present disclosure.

FIG. 3 is a block diagram illustrative of the ESD protection device of the present disclosure. ESD pipolar transistor 12 is connected to supply terminals VPP and VSS. During an ESD event, control circuit 14 applies an activation signal at the base of transistor 12 to turn it on and thus divert ESD discharge current away from the circuit to be protected. False trigger prevention circuit 16 is connected in series with capacitive downsize circuit 18 across the supply terminals. The output of false trigger prevention circuit 16 is applied to control circuit 14, providing a positive feedback thereto to prevent false triggering of transistor 12 during rapid noise in the programming mode of the OTP device. Capacitive downsize circuit 18 provides equivalent capacitance under normal and ESD modes, while reducing the area of the integrated circuit.

Figure 4B:
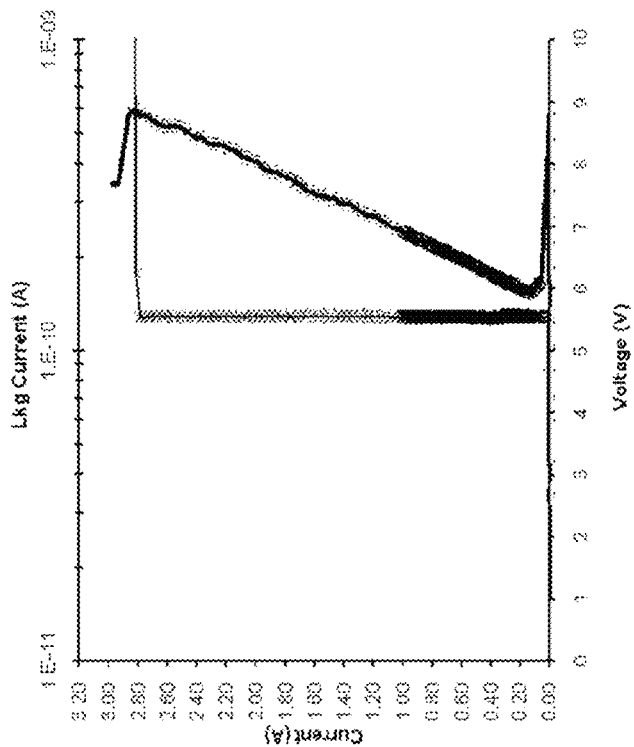
FIGS. 4a 4b are a detailed schematic diagram in accordance with the device exemplified in FIG. 3, and a corresponding TLP characteristic representation thereof, respectively.
Figure 4A:
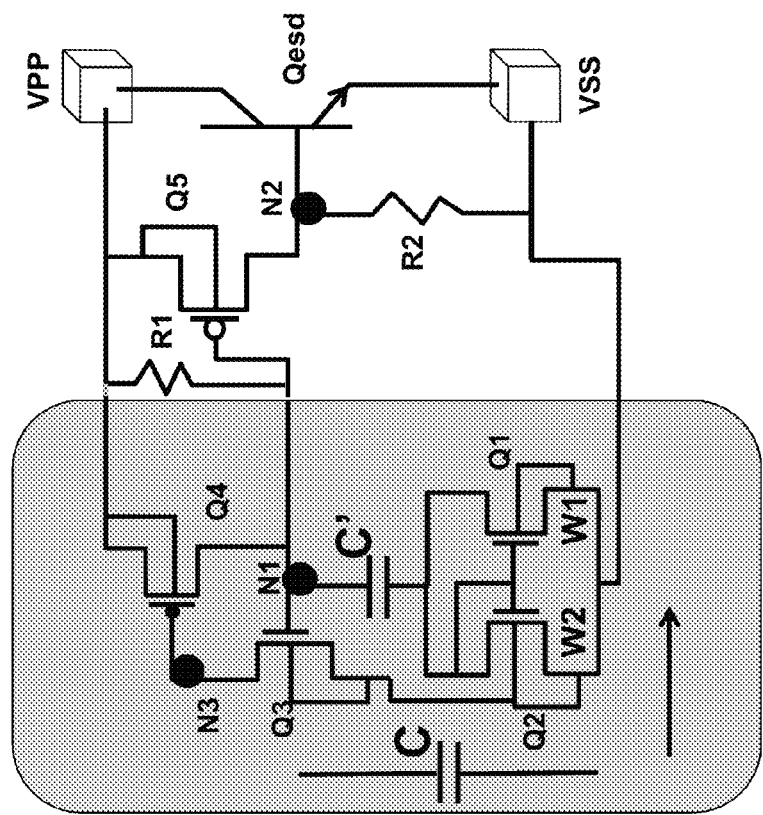

FIG. 4a is a schematic diagram of the protection device represented in FIG. 3. Control circuit 14 comprises FET Q5 connected in series with resistor R2 across the supply terminals. Junction node N2 is connected to the base of transistor 12. Resistor R1 is connected between supply VPP and the gate of FET Q5.

False trigger prevention circuit 16 comprises FET Q4 and FET Q3. FET Q4 is connected in parallel with resistor R1, between VPP and node N1. Node N1 is also connected to the gate of FET Q3. FET Q3 is connected between the gate of FET Q4 at node N3 and VSS.

Capacitive downsize circuit 18 comprises the series connection of capacitor C' and a current mirror between node N1 and VSS. The current mirror comprises FET Q1 and FET Q2 connected in parallel, their gates connected together. The equivalent capacitance of circuit 18 is represented in FIG. 4a as "C." The downsize circuit 18 provides a capacitive multiplication factor M, wherein M=W2/W1, and C=C'*(1+M).

Under normal operation mode, in the absence of an ESD event, Q5 is off. Node N1 is at a high state, as it is at the potential of VPP by virtue of its connection to R1. FET Q3 is on by virtue of the high state of N1. N3 is thus at the low state of VSS and turns FET Q4 on to maintain node N1 at the high VPP value. Node N2 is at the low state of VSS by virtue of its connection through resistor R2.

Under ESD operation mode, node N1 is at VSS level, and both FET Q3 and FET Q4 will be off. FET Q5 is on, so that node N2 will be high through FET Q5. Transistor Qesd is rendered on to bypass ESD current through VPP pad.

The advantages of the false trigger prevention circuit can be understood in relation to operation during normal programming. Ideally, the potential of nodes N1 and N2 should be same as in the normal operation described above, i.e., high and VSS, respectively. In the absence of FET Q3 and FET Q4, programming noise can change the voltage level of node N1 to VSS, and the voltage level of N2 will change to high, causing transistor Qesd to turn on. False triggering then occurs. In the presence of the FET Q3 and FET Q4 in circuit 16, the following operation takes place during programming. Initially, node N1 is at a high potential. In the presence of noise, FET Q3 and FET Q4 provide positive feedback to node N1 to maintain it at a high potential state. Node N2 will remain at the VSS potential and transistor Qesd will not turn on. False triggering is thus prevented.

The RC time constant of this exemplified embodiment is designed to be around 2 us. Thus, the ESD device will not be triggered under a programming operation mode with 50 us pulse width and 10 us rising time.

As indicated in the TLP characteristic of FIG. 4b, ESD performance (It2) is approximately 2.8 A, which is within specification. The holding voltage (Vh) is around 6.0V, which is greater than the maximum operating voltage. The trigger voltage Vt1 is reduced, in comparison with that of FIG. 2b, and meets the requirement of around 9.V with well-controlled mis-triggering RC elements.

The embodiments of the present disclosure can achieve several technical effects, including OTP ESD protection with robust ESD performance for high voltage applications, with no gate oxide reliability concerns, and more efficient use of I/O area. The present disclosure enjoys industrial applicability as, for example, microprocessors, smart phones, mobile phones, cellular handsets, set-top boxes, DVD recorders and players, automotive navigation, printers and peripherals, networking and telecom equipment, gaming systems, digital cameras, or any other devices utilizing logic or high-voltage technology nodes. The present disclosure therefore enjoys industrial applicability in any of various types of highly integrated semiconductor devices, including devices that use ESD protection devices to pass ESD/Latch-up standards specifications (e.g., liquid crystal display (LCD) drivers, synchronous random access memories (SRAM), One Time Programming (OTP), and power management products).

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. An electrostatic discharge (ESD) protection device for protecting a one-time programmable (OTP) integrated circuit device, comprising:
 a bipolar lateral transistor coupled to a pair of supply terminals;
 a control circuit coupled to a control element of the transistor;
 a false trigger prevention circuit having an output connected to the control circuit;
 a downsize capacitive circuit;
 wherein the false trigger prevention circuit and the downsize capacitive circuit are connected in series across the supply terminals, and
 wherein the ESD protection device has a trigger voltage of at least 8.6V.

2. An ESD protection device according to claim 1, wherein the downsize capacitive circuit comprises a current mirror circuit.

3. An ESD protection device according to claim 1, wherein:
 the control circuit comprises an FET transistor connected in series with a resistor across the bipolar transistor, a junction between the control transistor and the resistor connected to the base of the bipolar transistor; and
 the output of the false trigger prevention circuit comprises an output node that is connected to the gate of the control transistor.

4. An ESD protection device according to claim 3, wherein the false trigger prevention circuit comprises:
 a first trigger circuit FET connected between a first said supply terminal and the false trigger prevention circuit output node; and
 a second trigger circuit FET connected between the gate of the first false trigger prevention circuit FET and a second said supply terminal, the gate of the second false trigger prevention circuit FET connected to the false trigger prevention circuit output node.

5. An ESD protection device according to claim 4, wherein the downsize capacitive circuit comprises a capacitor and current mirror connected in series between the false trigger prevention circuit output node and the second said supply terminal.

6. An ESD protection device according to claim 5, wherein the current mirror comprises first and second capacitive circuit FETs connected in parallel, the gates of the capacitive circuit FETs connected to each other.

7. An ESD protection device according to claim 6, wherein the control circuit further includes a resistor having a resistive value set to configure the resistive-capacitive time constant of the circuit commensurate with a programming operation mode of a one-time programmable (OTP) device to which the ESD protection device is connected.

8. An ESD protection device according to claim 1, wherein the OTP integrated circuit device has 8.5V programming voltage.

9. An ESD protection device according to claim 1, wherein the trigger voltage is between 8.6V and 9.6V.

10. A method for protecting a one-time programmable (OTP) integrated circuit device against damage by electrostatic discharge damage from a pair of supply terminals, the method comprising:
 determining a voltage margin between a voltage level for triggering diversion of electrostatic current discharge from the supply terminals and a voltage level for programming operation of the OTP device;
 coupling a bipolar lateral transistor between the supply terminals; and
 controlling activation of the transistor in response to a false trigger prevention circuit,
 wherein the OTP device has a trigger voltage of at least 8.6V.

11. A method according to claim 10, wherein the step of controlling comprises coupling a control circuit to the base of the bipolar transistor and coupling an output of the false trigger circuit to the control circuit.

12. A method according to claim 11, further comprising connecting the false trigger circuit in series with a downsize capacitive circuit across the pair of supply terminals.

13. A method according to claim 12, wherein:
 the control circuit comprises an FET transistor connected in series with a resistor across the bipolar transistor, a junction between the control FET transistor and the resistor connected to the base of the bipolar transistor; and
 the output of the false trigger circuit comprises an output node that is connected to the gate of the control transistor.

14. A method according to claim 13, wherein the false trigger circuit comprises:
 a first trigger circuit FET connected between a first said supply terminal and the false trigger circuit output node; and
 a second trigger circuit FET connected between the gate of the first false trigger circuit FET and a second said supply terminal, the gate of the second false trigger circuit FET connected to the false trigger circuit output node.

15. A method according to claim 14, wherein the downsize capacitive circuit comprises a capacitor and current mirror connected in series between the false trigger circuit output node and the second said supply terminal.

16. A method according to claim 15, wherein the current mirror comprises first and second capacitive circuit FETs connected in parallel, the gates of the capacitive circuit FETs connected to each other.

17. A method according to claim 16, wherein the control circuit further includes a resistor having a resistive value set to configure the resistive-capacitive time constant of the circuit commensurate with the determined voltage margin.

18. A method of activating an electrostatic discharge (ESD) protection device connected to a one-time programmable (OTP) device comprising:
 coupling a bipolar lateral transistor to a pair of supply terminals;
 coupling a control circuit to the base of the bipolar transistor;
 coupling an output of a false trigger prevention circuit to the control circuit; and
 connecting a downsize capacitive circuit and the false trigger prevention circuit in series across the supply terminals,
 wherein:
 the control circuit comprises an FET transistor connected in series with a resistor across the bipolar transistor, a junction between the control FET transistor and the resistor being connected to the base of the bipolar transistor;

the false trigger prevention circuit comprises:

a first trigger circuit FET connected between a first said supply terminal and the false trigger circuit output node; and a second trigger circuit FET connected between the gate of the first false trigger circuit FET and a second said supply terminal, the gate of the second false trigger circuit FET being connected to the false trigger circuit output node;

the output of the false trigger prevention circuit comprises an output node that is connected to the gate of the control transistor;

the downsize capacitive circuit comprises a capacitor and a current mirror connected in series between the false trigger circuit output node and the second said supply terminal; and wherein the OTP device has a trigger voltage of at least 8.6V.

19. The method according to claim 18, wherein the current mirror comprises first and second capacitive circuit FETs connected in parallel, the gates of the capacitive circuit FETs connected to each other.

20. The method according to claim 18, wherein the control circuit further includes a resistor having a resistive value set to configure the resistive-capacitive time constant of the circuit commensurate with a programming operation mode of the OTP device to which the ESD protection device is connected.

* * * * *